United States Patent [19]

Myers

[11] Patent Number: 5,550,534
[45] Date of Patent: Aug. 27, 1996

[54] COMPUTERIZED MAGNETIC KEY PROGRAMMER

[76] Inventor: Thomas R. Myers, 300 Miramonte, Palo Alto, Calif. 94306-1032

[21] Appl. No.: 319,458

[22] Filed: Oct. 5, 1994

[51] Int. Cl.$^6$ ............................................. H04Q 1/00
[52] U.S. Cl. ................ 340/825.34; 235/449; 340/825.31
[58] Field of Search ......................... 340/825.34, 825.31; 364/242.4, 479; 235/449, 440

[56] References Cited

U.S. PATENT DOCUMENTS

| | | | |
|---|---|---|---|
| 3,581,030 | 5/1971 | Sedley | 200/46 |
| 3,595,042 | 7/1971 | Sedley | 70/276 |
| 3,596,250 | 7/1971 | Sedley | 340/167 R |
| 3,678,218 | 7/1972 | Kamenir et al. | 179/100.2 C |
| 3,924,115 | 12/1975 | Hampton et al. | 240/6.4 R |
| 3,999,023 | 12/1976 | Sedley | 200/46 |
| 4,019,206 | 4/1977 | Haas | 360/123 |
| 4,077,242 | 3/1978 | Sedley | 70/413 |
| 4,087,660 | 5/1978 | Sedley | 235/449 |
| 4,128,851 | 12/1978 | Sedley | 360/4 |
| 4,133,194 | 1/1979 | Sedley et al. | 70/222 |
| 4,146,174 | 3/1979 | Darjany | 235/449 |
| 4,312,198 | 1/1982 | Sedley | 70/276 |
| 5,245,359 | 9/1993 | Ito | 346/139 R |
| 5,264,685 | 11/1993 | Eisermann | 235/382.5 |
| 5,397,886 | 3/1995 | Mos | 235/440 |
| 5,423,619 | 7/1995 | Kohno | 400/525 |

FOREIGN PATENT DOCUMENTS 254389 12/1985 Japan.

*Primary Examiner*—Brian Zimmerman

[57] ABSTRACT

An apparatus for programming a magnetic card key associated with a magnetic locking device. The apparatus is comprised of a computer coupled to an encoder unit. A list of codes are stored on the computer system. When a user desires to encode a magnetic card key, the identification corresponding to that particular key is input to the computer. Thereupon, the computer searches for the matching code. The magnetic card key is inserted into the encoder unit. A bank of electromagnets mounted in close proximity to the inserted magnetic card key is programmed by the computer to encode the key with the proper code.

9 Claims, 14 Drawing Sheets

WIRING OF ELECTROMAGNETS

COMPUTERIZED MAGNETIC KEY PROGRAMMER

FIELD OF THE INVENTION

The present invention pertains to the field of magnetic locking devices. More particularly, the present invention relates to a computerized apparatus and method for programming a magnetically encoded key used to unlock a mechanical magnetic key-operated door lock.

BACKGROUND OF THE INVENTION

Today, there exists a wide array of mechanical door locks which can be unlocked by thin, credit-card sized magnetic keys. Operation of these types of locks are based on the principle of using magnetic card keys which are encoded with a unique pattern of magnetic spots to unlock a mechanical door lock. Provided that a correctly encoded magnetic card key is inserted into its matching door lock, the magnetic spots on the card key align with the locking pins that normally holds a moveable slide in a locked position. These magnetic spots will magnetically repel the locking pins out of the holes of a locking plate, thereby permitting the slide to be moved to an unlocked position. If an incorrect key is inserted, its magnetic spots will not be of the proper pattern and/or polarity to cause the locking pins to be repelled to the unlocked state. One example of such a magnetic key locking system is described in U.S. Pat. No. 4,312,198.

The attractiveness of using magnetic key locks is due to the fact that the combination of a particular lock can be readily altered. Thereby, there is no need to physically remove and replace an existing door lock. Instead, one only needs to change its combination. In this manner, when a guest departs a hotel, the combination for that particular room's lock can be changed, and an arriving guest is provided with a correctly encoded key. Furthermore, the magnetic credit keys can be programmed to provide for different access privileges. For instance, a janitor might be issued a key granting access to certain areas, whereas a vice-president can have a key that provides access to more sensitive areas.

In the past, the magnetic card keys were encoded with their respective magnetic spot patterns at the factory. When a need to change the coding of a key, the key was sent back to the factory. This process was unwieldy, time-consuming, and unduly restrictive. In an effort to provide for greater flexibility and faster turn-around time, a manually operated hand-held encoder was developed. One such hand-held encoder is described in U.S. Pat. No. 4,128,851.

Typically, the card key was first inserted into a template. The template had a number of holes punched out which specifies the magnetic spot pattern. The holes were usually color coded to inform the operator of the proper polarity for each of the magnetic spots. The human operator would then insert the tip of the hand-held encoder into the first hole of the template. Next, the operator would flip a switch to place the encoder at the proper polarity specified by the template. Thereupon, the operator would depress a trigger on the encoder to initiate its electronics for magnetically encoding that spot. The operator would repeat this procedure for each and every one of the numerous spots on the card key.

Although this hand-held encoder allows the card keys to be encoded on-site, it has several drawbacks. Foremost, this type of encoder is extremely labor-intensive and time-consuming. And besides being tedious, this encoding process is also very error-prone. Just one mistake in the coding of a single magnetic spot will render that key inoperative. These problem are compounded when many keys need to be re-encoded.

Thus, there exists a need for an apparatus and method for encoding the card keys on-site which is efficient, quick, reliable, and cost-effective.

SUMMARY OF THE INVENTION

The present invention pertains to an apparatus and method for programming a magnetic card key associated with a magnetic locking device. The apparatus is comprised of a computer coupled to an encoder unit. A list of codes are stored on the computer system. When a user desires to encode a magnetic card key, the identification corresponding to that particular key and lock combination is input to the computer. Thereupon, the computer searches for the correct code for unlocking the magnetic locking device. The magnetic card key is inserted into the encoder unit. A bank of electromagnets mounted in close proximity to the inserted magnetic card key is programmed by the computer to encode the key with the proper polarities.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A computerized magnetic card key programmer is described. In the following description, for purposes of explanation, numerous specific details are set forth, such as voltages, component values, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. Furthermore, although the following description is made in reference to a computer system, it would be appreciated by one skilled in the art that a dedicated processor or controller can be substituted in place of the computer system, while still providing the same functionality.

Figure 1:
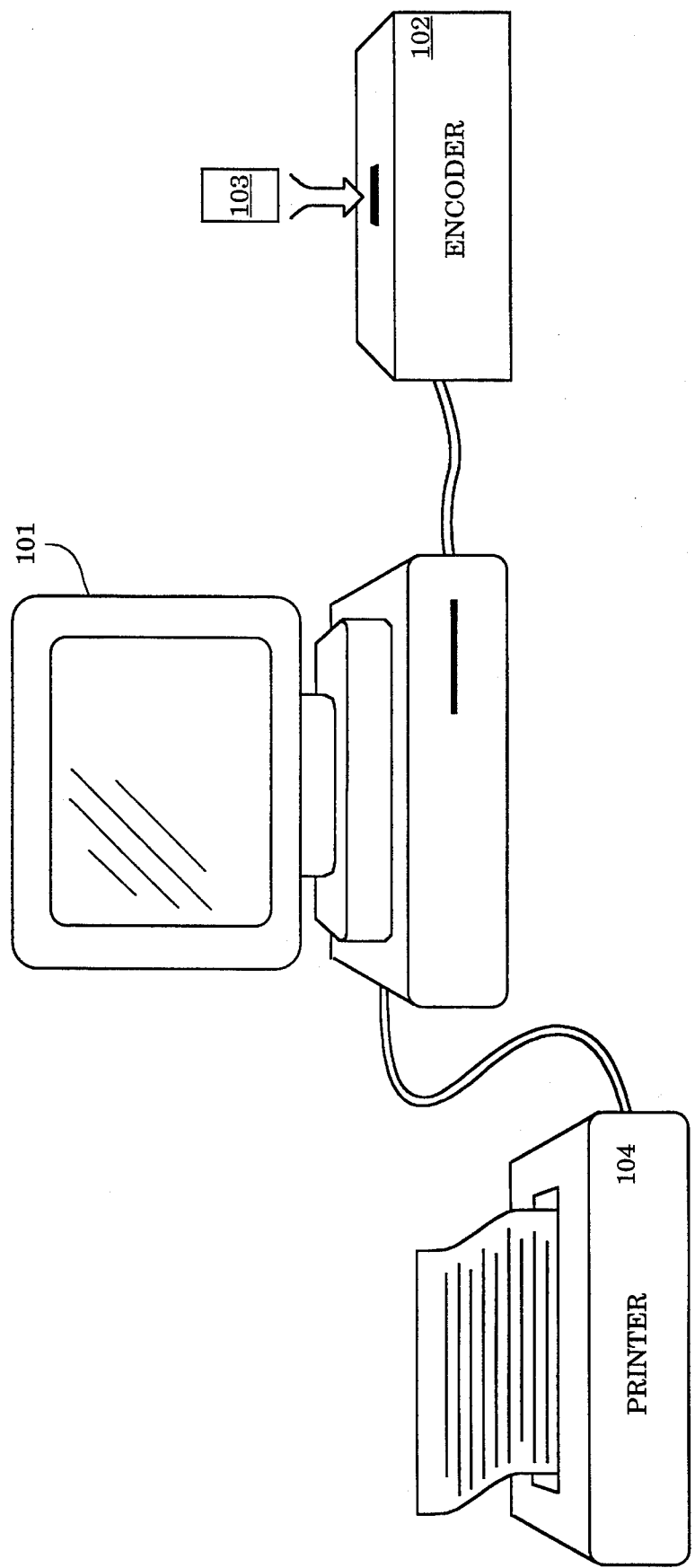
FIG. 1 shows the computer system upon which a preferred embodiment of the present invention is implemented.

Referring to FIG. 1, a block diagram of a computer system 101 coupled to an encoder box 102 is shown. Computer system 101 can be a personal computer, mini or microcomputer, a workstation, a laptop computer, or a dedicated processor/micro-controller. In fact, computer system 101 and encoder 102 can be integrated into one single unit. However, in the currently preferred embodiment, encoder box 102 is coupled to a serial port of a personal computer 101. Additional encoder boxes for encoding magnetic card keys having different configurations can also be coupled to and controlled by the other serial ports of personal computer 101. As a safeguard, when the computer is first accessed, it interrogates the devices that are connected to its serial ports. If an expected reply specific to an encoder is not received, the computer system shuts down. Hence, unless an encoder is connected to the computer system, access to the sensitive key codes is denied.

Figure 2:
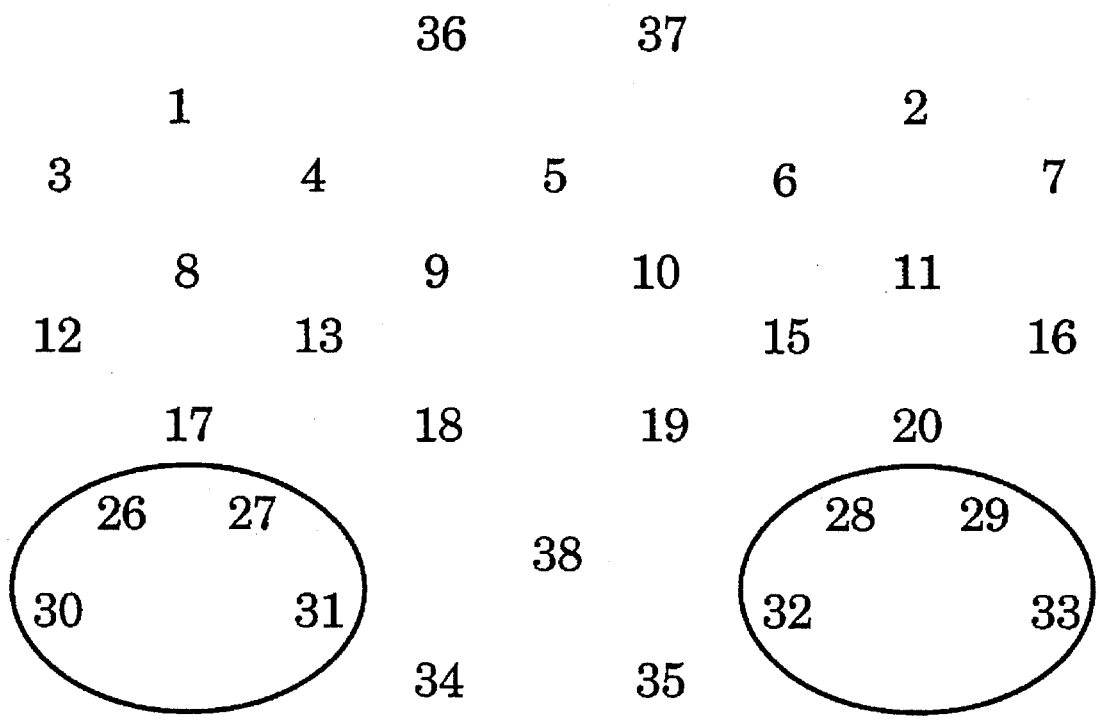
FIG. 2 shows a sample image of a Trisec spot configuration.

When computer system 101 is accessed, it displays a current directory ID. The directory contains a list of data files specifying key and lock information. The user either creates a new data file or retrieves an established data file corresponding to the type of card key 103 that was inserted into encoder 102. Thereupon, the computer monitor displays an image of the magnetic spots according to the accessed data file. FIG. 2 shows a sample image of a Trisec spot configuration (Trisec is a magnetic spot pattern utilized by Corkey Control Systems, Inc., Hayward, Calif., in their magnetically controlled keys). Note that magnet numbers (30, 26, 27, and 31) and (32, 28, 29, and 33) can be rotated within the locks to provide for additional permutations of combinations. The user can select certain spots and designate their polarities (e.g., North or South). Subsequently, a user can elect to edit this data. Furthermore, software in the computer system 101 can be programmed to generate the various key codes for a particular data file. For example, the software can generate all of the key codes for the data file of a hotel.

In the currently preferred embodiment, there are several different modes that are available. In one mode, after the user has inserted the card key, the user hits a switch or key on the computer's keyboard to start the encoding process. In the autoprogram mode, the computer system introduces a pre-programmed delay (e.g., 3 seconds) in-between programming sequences. Hence, a user can simply insert keys, one after another, until all the keys have been encoded. The computer system automatically programs these keys according to the data stored in the data file. In another mode, an infrared photo cell, photo source diode, pressure switch, or some other type of sensor is used to detect the insertion of card key 103. Preferably, a small hole is made in the bottom of the key slot. A light source is placed to focus a light beam at a light detector located at the opposite side of the slot. Thus, when a card key is placed in the slot, the light beam is disrupted and a signal is generated by the light detector to indicate the insertion of the card key in the key slot of the encoder. As soon as the insertion of a card is detected, computer system 101 automatically starts encoding that card key. In addition, a printer 104 may be coupled to computer system 101. While a card key 103 is being encoded, printer 104 can either print out labels or stamp an encoded key with an ultraviolet identification.

Figure 3:
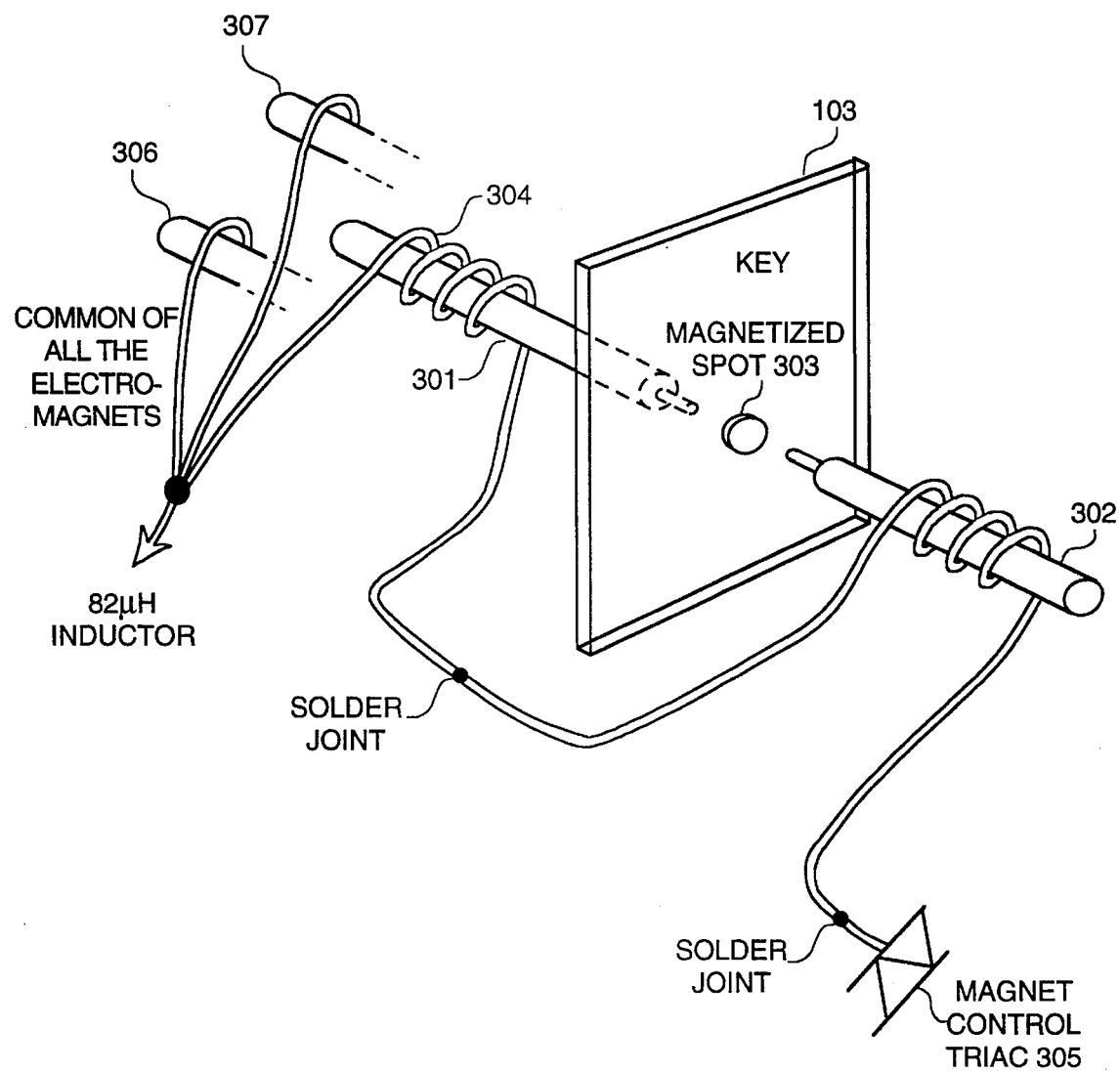
FIG. 3 shows an example of a pair of electromagnets 301 and 302 used to magnetize a spot 303 of card 103.

Within encoder 102 is an array of electromagnets which are fixed in a "push-pull" configuration on either side of the slot for receiving card 103. FIG. 3 shows an example of a pair of electromagnets 301 and 302 used to magnetize a spot 303 of card 103. A pair of electromagnets, 301, 302, are used in a push-pull configuration to produce sufficient energy to program a spot 303 of card 103. When a current from an inductor and capacitor (not shown) is passed through wire 304, a magnetic field is produced by the windings of wire 304 about the cores of electromagnets 301 and 302. The magnetic fields generated by electromagnets 301 and 302 are passed through the card 103. Wire 304 is then terminated at one end by a magnet control triac 305. The magnet control triac 305 functions as a switch control whether the electromagnets 301, 302, generate the magnetic fields to magnetize the particular spot on the key surface the electromagnets are located adjacent to. This arrangement is repeated for each of the other magnetic spots of key 103 (e.g., electromagnets 306 and 307).

Since the physical distance between each of the magnetic spots is small (e.g., 0.002 inches apart), a magnetic field that is short, precise, and intense needs to be generated in order to properly magnetize a particular spot without interfering with the magnetization of its surrounding spots. In the currently preferred embodiment, a magnetic field that peaks for approximately 0.25 millisecond is generated by a pair of electromagnets (e.g., electromagnets 301–302). The entire pulse lasts approximately two milliseconds. An RLC circuit is coupled to wire 304 to generate a large resonating signal at a resonant frequency such to provide a 2 millisecond pulse having at least an 84 ampere peak amplitude.

In the currently preferred embodiment, electromagnets fashioned from an ultra-low carbon steel core are used to generate the pulse. A lower carbon content translates into a higher magnetization capacity and, hence, a greater magnetic field. The core is approximately three inches long, 0.1406 inches in diameter, and at one end, the core is turned down for a length of approximately 0.063 inches to a diameter of approximately 0.1351 inches, such that the tip of the magnet at the diameter of 0.1351 inches is flush with the head plate. A twenty-two gauge enamel insulated magnet wire is wound clockwise about the core approximately eighty-four and a half times. The closest pair of electromagnets are spaced approximately 0.002 inches apart.

Figure 4A:
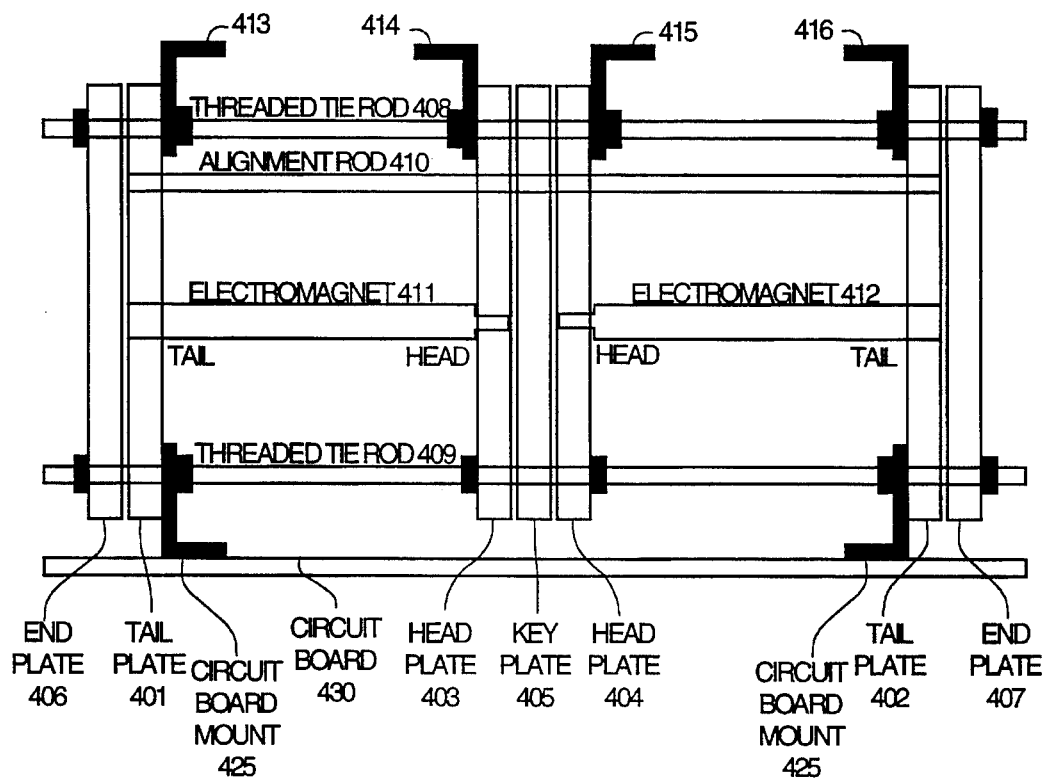
FIG. 4A shows a side view of the frame plates and rods for holding the electromagnets.

FIG. 4A shows a side view of the frame plates and rods for holding the electromagnets. The opposing ends of the electromagnets on either side of the slot are passed through holes in the two tail plates 401–402. The other ends of the electromagnets (i.e., the turned down ends) are passed through two head plates 403–404. The holes in tail plates 401–402 and head plates 403–404 match the spots of an inserted card key. Thus, when the electromagnet cores are inserted through these holes, the electromagnets correctly align with the spots of the card key. Furthermore, a U-shaped key plate 405 is sandwiched in-between the two head plates 403–404. Key plate 405 contains the slot for receiving the card. Two end plates 406–407 are used to provide backing for tail plates 401–402. Finally, threaded tie rods 408–409, extending through the end plates 406–407, tail plates 401–402, head plates 403–404, and key plate 405 are used to hold these plates together. A number of alignment rods (e.g., rod 410), extending through tail plate 401–402, head plates 403–404, and key plate 405, are used to ensure that the electromagnets are properly aligned with the spots of the card key when inserted into the slot.

Figure 4B:
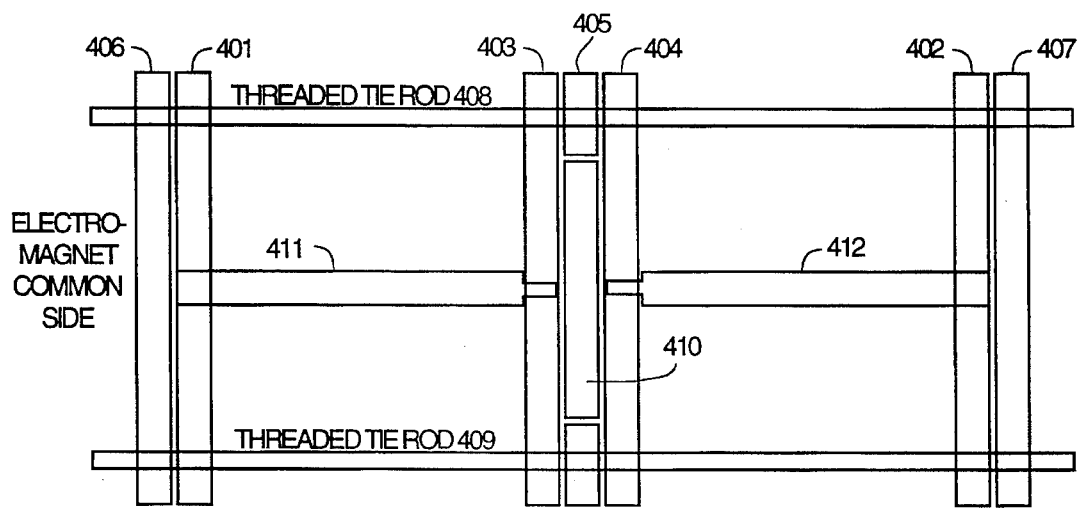
FIG. 4B shows a top view of the frame plates and tie rods.

In addition, magnetically insulated circuit board mounts 425 connect the plate rod structure to a circuit board 430 containing the circuitry to power and control the electromagnets 411, 412. Included in the circuitry on the circuit board 430 are the magnet control triacs 435 (305, FIG. 3), one for each pair of electromagnets 411, 412. The triacs 435 are preferably located in sufficient proximity to the electromagnets 411 or 412 such that the length of wire between each triac 435 and the corresponding electromagnet 411 or 412 is minimized, thereby minimizing the series resistance of the RLC circuit. FIG. 4B shows a top view of the frame plates and tie rods. It can be seen that the tips of electromagnets 411–412 extend flush to the edge of slot 410. A number of brackets 413–416 are used to mount the frame plate containing the electromagnet array to the encoder's housing.

Head plates 403–404 and key plate 405 are formed from non-magnetic material (e.g., brass or stainless steel metals). Consequently, the intense magnetic field created by the electromagnets passes through the card key in the slot. The alignment rods are formed from the same low-carbon steel as that of the electromagnet cores. Thereby, a complete magnetic loop is created as the magnetic field generated at the head of electromagnet 411 passes through the card key in slot 410 to the head of electromagnet 412, through the tail electromagnet 412 to tail plate 402, through the alignment rods to tail plate 401, and finally to the tail of electromagnet 411. Prior art devices utilize the capability of magnetic fields to move through air to complete the magnetic loop necessary to operate. However, it is quite inefficient to use air as part of the media to transmit the magnetic fields. By creating a complete magnetic loop, in which a pathway is constructed of materials that pass magnetic fields with little or no reluctance, the device operates in a highly efficient manner. Thus, smaller electromagnets can be utilized. Furthermore, these smaller electromagnets can be placed in closer proximity to one another, thereby enabling higher densities of magnetic spots to be programmed. When positive current is flowing from the inductor to the control triac, a positive (i.e., North) spot is created. Likewise, if the current flows in the opposite direction, a negative (i.e., South) spot is created.

Figure 5:
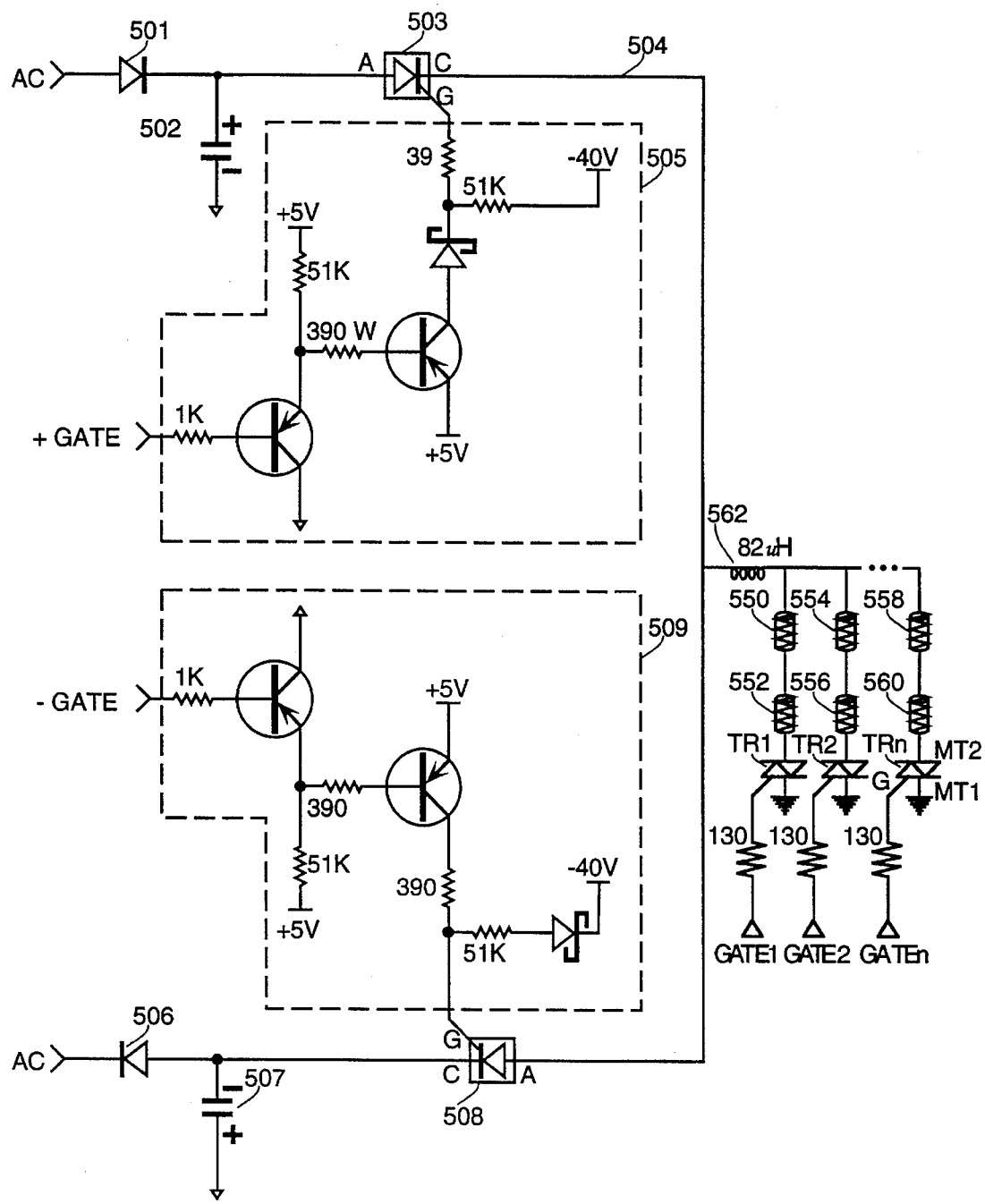
FIG. 5 shows circuitry of the main power supply.

The current and its direction is generated as follows. A transformer is used to provide the AC signal needed for generating the high current pulses of the electromagnets. Referring to FIG. 5, the circuitry of the encoder providing the power necessary to drive the electromagnets is shown. The AC signal is input to a fast diode 501, such as an MUR 420 from Motorola. When diode 501 is forward conducting, capacitor 502 is being charged. Capacitor 502 is a 1200 microfarad, 75 V, CGR computer-grade capacitor (manufactured by Mallory Corporation). Once charged, a silicon controlled rectifier (SCR) 503, such as the MCR265-6 manufactured by Motorola, is used to discharge capacitor 502 onto the high-current line 504. The SCR 503 is triggered, and therefore the discharge of the capacitor 502 is initiated, when the current through the gate of SCR 503 exceeds a threshold current level. SCR 503 remains conductive as long as the current from the anode to cathode exceeds the holding current level. In other words, SCR 503 acts as a switch which is turned on according to its gate current and which is turned off according to its anode to cathode current. It is apparent to one skilled in the art that other switches that are turned on by a trigger pulse and turned off by zero current flow can be used in place of a SCR. The current to the gate of SCR 503 is supplied by a small amplifier 505, which is controlled by the +GATE signal. The +GATE signal is provided by the control circuitry to indicate the polarity of the magnetization.

A similar configuration is used for the negative current side. It can be seen that the polarities of the diode 506, capacitor 507, and SCR 508 are reversed for the negative current. The -GATE signal, also provided by the control circuitry, in conjunction with amplifier 509, are used to control SCR 508. Thus, when the +GATE signal causes capacitor 502 to be discharged, the spot is encoded with a positive (i.e., North) polarity. Conversely, when the -GATE signal causes capacitor 507 to be discharged, the spot is encoded with a negative (i.e., South) polarity.

The high current pulse is coupled to electromagnets 550, 552, 554, 556, 558, 560, through inductor 562. An electromagnet pair, e.g., 550 and 552, and 554 and 556, or 558 and 560, is selected by issuing control signals GATE1, GATE2 and GATEn, respectively. Once a pair of electromagnets is selected, the high current pulse travels through the windings of the electromagnets selected, to generate the magnetic field required to program the key.

It should be noted that the high-current path 504 is connected to a single ground tie point in order to prevent offset voltages due to the high current pulses from inducing logic ground bounce. It should further be noted that it is critical that the positive capacitor 502 be discharged to the extent that SCR 503 is turned off within the negative half-cycle of the AC signal. Otherwise, positive capacitor 502 will be re-charged by the following positive half-cycle while SCR 503 is still turned on (i.e., conducting). If capacitor 502 is re-charged without SCR 503 being first shut off, SCR 503 will remain turned on. Eventually, during the next negative half-cycle, the negative capacitor 507 will start to discharge. Having both the positive and the negative capacitors discharging at the same time is very undesirable because the power supply will be effectively shorted out. Hence, given a 60 Hz AC signal having a 16.6 msec period, it is imperative that the positive capacitor be discharged to the extent to turn off SCR 503 within the 8.3 msec negative half-cycle. Similarly, it is imperative that the negative capacitor 507 be discharged to the extent to turn off SCR 508 within the 8.3 msec positive half-cycle.

In the currently preferred embodiment, rather than operating as a slow capacitive discharge circuit, the power supply acts as a tuned resonating underdamped RLC circuit having a ringing waveform. After the occurrence of the first resonation peak, that is, when this ringing waveform first crosses the zero ampere point, the lack of current shuts off the SCR 503 and triac 305. An RLC circuit is underdamped if the term $4L/R^2C$ exceeds 1. The greater this value exceeds 1, the more underdamped the circuit becomes and the faster that the positive capacitor 502 is discharged. By examining the $4L/R^2C$ term, it is clear that the inductance should be made very large, whereas the resistance and capacitance should be minimized. Of course, the capacitance should still be sufficient to source enough charge to produce the required magnetization of the electromagnets. In the currently preferred embodiment, an 82 µH Dale inductor (IHB-6 series of Dale Inductors with a 35 ampere continuous current rating), computer-grade capacitors having minimal series resistance, 50 mohm triacs and SCRs, and #10 gauge wire having a resistance of 83 µohm per inch are used. This yields a peak current of at least 84 amperes and a turn-off time of approximately 2 msec, which is well within the 8.3 msec limit. Note that because the high-current path is turned on at zero current and turned off at zero current, there is minimal radiated noise.

This procedure for generating positive or negative current pulses is repeated in series for each pair of electromagnets corresponding to the spots of the card key that need to be encoded. The particular electromagnet pair to become activated for receiving the high-current pulse is selected by triacs coupled to the end of each electromagnet pair. The triac functions as a switch to select an electromagnet pair to activate to program a particular magnetic spot on the key. Once the triac is selected, the triac permits current to flow in both directions between its main terminals thereby permitting programming of either North or South polarities. It is readily apparent to one skilled in the art that other devices providing similar functionality can be utilized.

Figure 6:
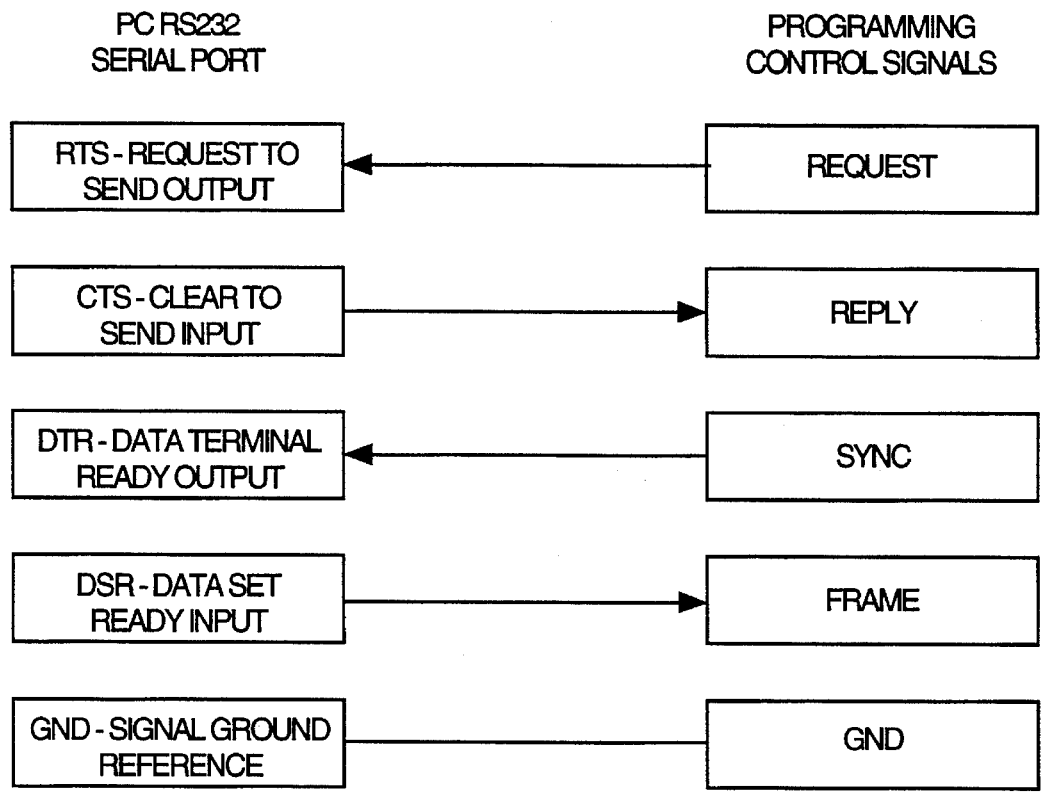
FIG. 6 shows the handshaking protocol.

A computer is used to specify whether a particular spot is to be encoded, and if the spot is to be encoded, the computer determines the encoded polarity (i.e., North or South). In the currently preferred embodiment, the encoder is coupled to an RS232 serial port of the computer system. Rather than using data signals, the handshaking signals are used for communications between the computer and the encoder. FIG. 6 shows the handshaking protocol. A serial port cable connects the Request To Send (RTS)/Clear To Send (CTS) and the Data Terminal Ready (DTR)/Data Set Ready (DSR) handshake control pairs.

Figure 7:
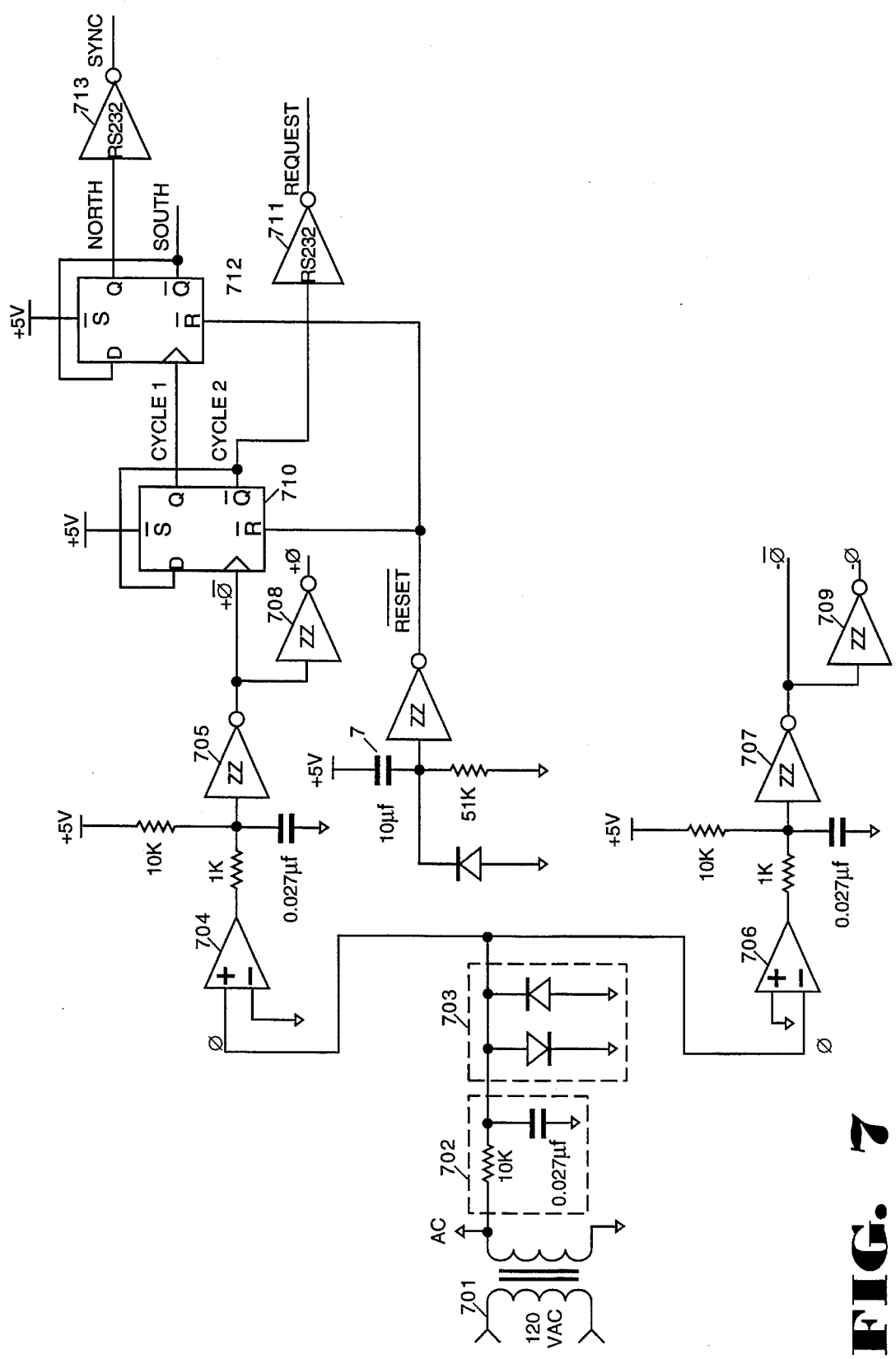
FIG. 7 shows a circuit diagram for generating the encoder's various signals used to control the encoding of the individual spots.

FIG. 7 shows a circuit diagram for generating the encoder's various signals used to control the encoding of the individual spots. The power supply consists of a 26 VAC at 2.25 ampere rated transformer 701. The AC output from the transformer is filtered by lowpass filter 702 and amplitude limited by diodes 703. The resulting phase signal $\emptyset$ is positive during the positive half cycle and negative during the negative half cycle. Comparator 704 and Schmidt trigger inverter 705 are used to generate the $+\emptyset$ signal. An additional Schmidt trigger inverter 707 generates the $+\overline{\emptyset}$ signal. The $+\emptyset$ signal is active high (i.e., logic "1" at +5V) during the positive half cycle of the AC waveform, and the $+\overline{\emptyset}$ signal is active low (i.e., logic "0" at 0V) during the positive half cycle of the AC waveform. Similarly, comparator 706 and Schmidt trigger inverter 707 are used to generate the $-\emptyset$ signal. An additional Schmidt trigger 709 is used to generate the $-\overline{\emptyset}$ signal. The $-\emptyset$ signal is active high during the negative half cycle of the AC waveform, and the $-\overline{\emptyset}$ signal is active low during the negative half cycle of the AC waveform. A time gap of about 100 μsec is introduced between the $+\emptyset$ and $+\overline{\emptyset}$ signals going active after $-\emptyset$ and $-\overline{\emptyset}$ signals become deactive. There is also time gap of about 100 μsec between $-\emptyset$ and $-\overline{\emptyset}$ going active after $+\emptyset$ and $+\overline{\emptyset}$ signals become deactive. These delays are introduced to ensure that the positive voltage capacitor discharges only when it is solidly in the negative half cycle and that the negative voltage capacitor discharges only when it is solidly in the positive half cycle.

Flip-flop 710 is used to generate the CYCLE1 and CYCLE2 signals by dividing the frequency of the $+\overline{\emptyset}$ signal in half. In other words, CYCLE1 and CYCLE2 signals are opposite logic clocks that run at half of the line frequency. The CYCLE2 signal is input to an RS-232 transceiver 711, which outputs the REQUEST signal. A pulse in the REQUEST signal transmitted to the computer system indicates a query to the computer system. If the computer system wishes to program that spot, it will acknowledge the REQUEST signal with a REPLY signal within a pre-determined amount of time. Otherwise, that spot will be skipped. In short, CYCLE1 is the REQUEST cycle, while CYCLE2 is the REPLY cycle.

Flip-flop 712 is used to divide the frequency of the $+\overline{\emptyset}$ signal in half for generating the NORTH and SOUTH signals. These signals are used to specify the encoded polarity of a spot. The NORTH and SOUTH signals are opposite logic clocks that run at a quarter of the line frequency. There is one REQUEST and one REPLY during each NORTH and each SOUTH cycle. Hence, for the first electromagnet, there is a corresponding NORTH cycle and SOUTH cycle. For that particular NORTH cycle, there is a separate REQUEST and REPLY. Likewise, there is another REQUEST and REPLY corresponding to the SOUTH cycle. If a REPLY is sent by the computer system during the NORTH cycle, the positively charged capacitor corresponding to that spot's electromagnet is discharged. If a REPLY is sent by the computer system during the SOUTH cycle, the negatively charged capacitor is discharged. If there is no REPLY within a specified time interval, then that particular spot is not encoded.

This process is repeated in series for each of the electromagnets. The computer keeps a count of the number of REQUEST pulses that were received. For example, a REPLY to the first REQUEST pulse actives electromagnet #1 with a NORTH polarity; a REPLY to the second REQUEST pulse activates electromagnet #1 with a SOUTH polarity; a REPLY to the third REQUEST pulse actives electromagnet #2 with a NORTH polarity; a REPLY to the fourth REQUEST pulse activates electromagnet #2 with a SOUTH polarity; etc. Consequently, there is an opportunity for each of the spots to be encoded with a NORTH polarity, a SOUTH polarity, or skipped.

Figure 8:
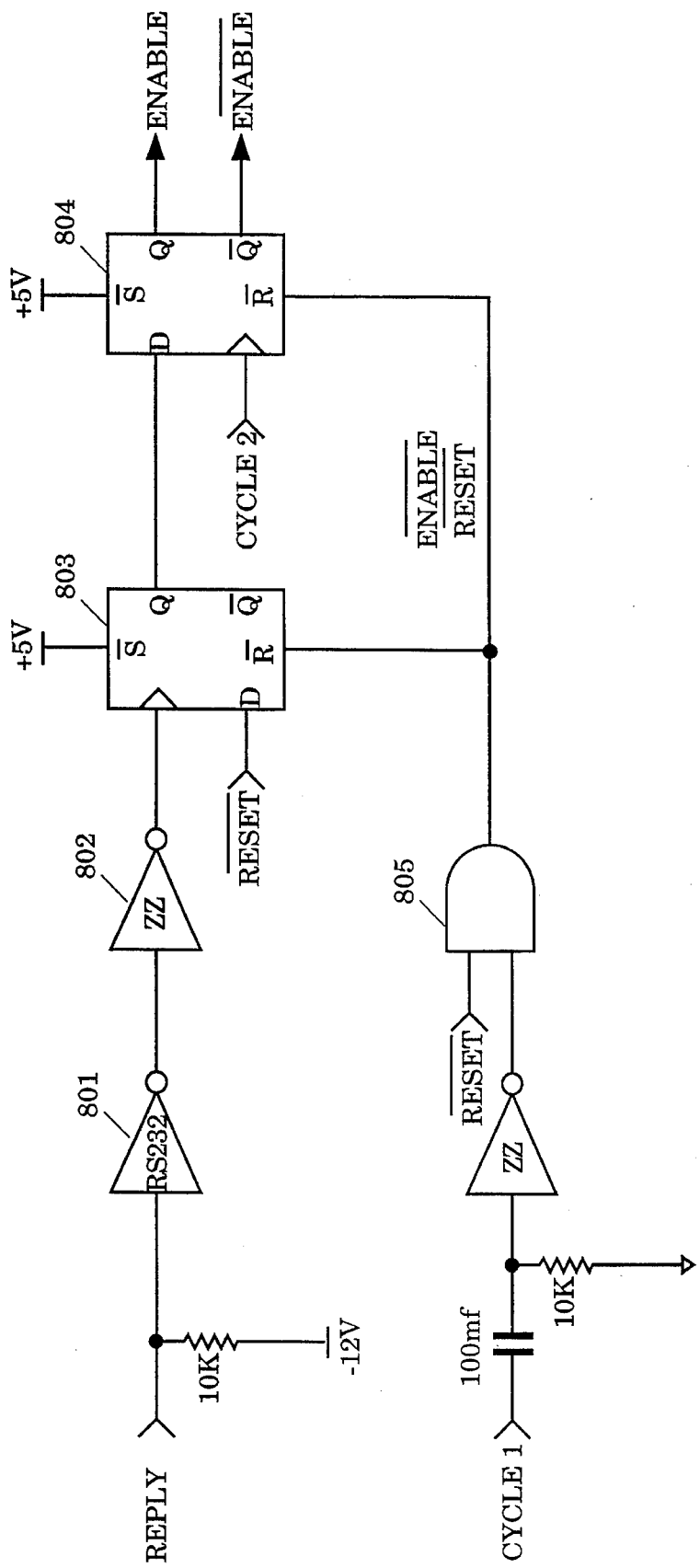
FIG. 8 shows a circuit diagram for generating the ENABLE and $\overline{\text{ENABLE}}$ signals.

FIG. 8 shows a circuit diagram for generating the ENABLE and $\overline{\text{ENABLE}}$ signals. The $\overline{\text{RESET}}$ signal is input to flip-flop 803. The received REPLY signal is processed by the RS-232 transceiver 801 and clocked to flip-flop 803 via a Schmidt trigger inverter 802. The output from flip-flop 803 is fed as the input to flip-flop 804. Flip-flop 804 is clocked by the CYCLE2 signal. Both of the flip-flops 804 and 805 are reset by the output signal from AND gate 805.

Figure 9A:
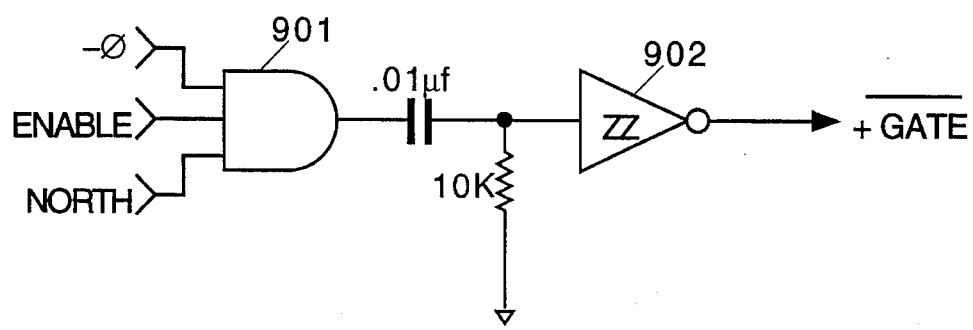
FIGS. 9A–C show the circuit diagrams used for generating the +GATE, –GATE, and $\overline{\text{TRIGGER}}$ signals.
Figure 9B:
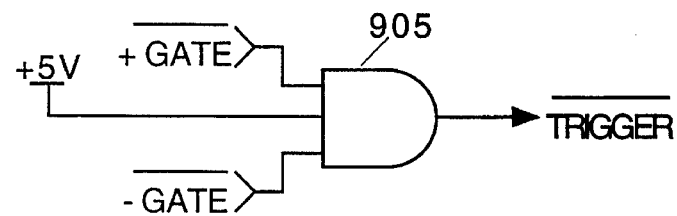
Figure 9C:
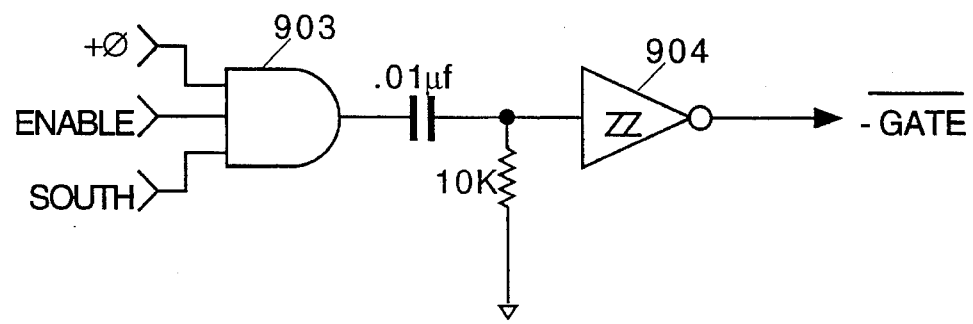

FIGS. 9A–C show the circuit diagrams used for generating the $+\overline{\text{GATE}}$, $-\overline{\text{GATE}}$, and $\overline{\text{TRIGGER}}$ signals. In FIG. 9A, the $-\emptyset$, ENABLE, and NORTH signals are ANDed together by AND gate 901. The rising edge of the result is then fed through a Schmidt trigger inverter 902 to produce the $+\overline{\text{GATE}}$ signal. In FIG. 9C, the $+\emptyset$, ENABLE, and SOUTH signals are ANDed together by AND gate 903. The rising edge of the result is then fed through a Schmidt trigger inverter 904 to produce the $-\overline{\text{GATE}}$ signal. The $\overline{\text{TRIGGER}}$ signal is generated by ANDing the $+\overline{\text{GATE}}$, +5V, and $-\overline{\text{GATE}}$ signals by AND gate 905, as shown in FIG. 9B.

A SYNC pulse is needed to synchronize the encoder with the computer system when the very first spot is initially to be encoded. Referring back to FIG. 7, the SYNC signal is generated by the output of the RS-232 transceiver 713. When the computer system detects a REQUEST and SYNC signal that are simultaneously active high, this indicates the very beginning of the encoding procedure. Thereupon, the computer system transmits a FRAME signal back to the encoder if it wishes to start a programming cycle.

Figure 10A:
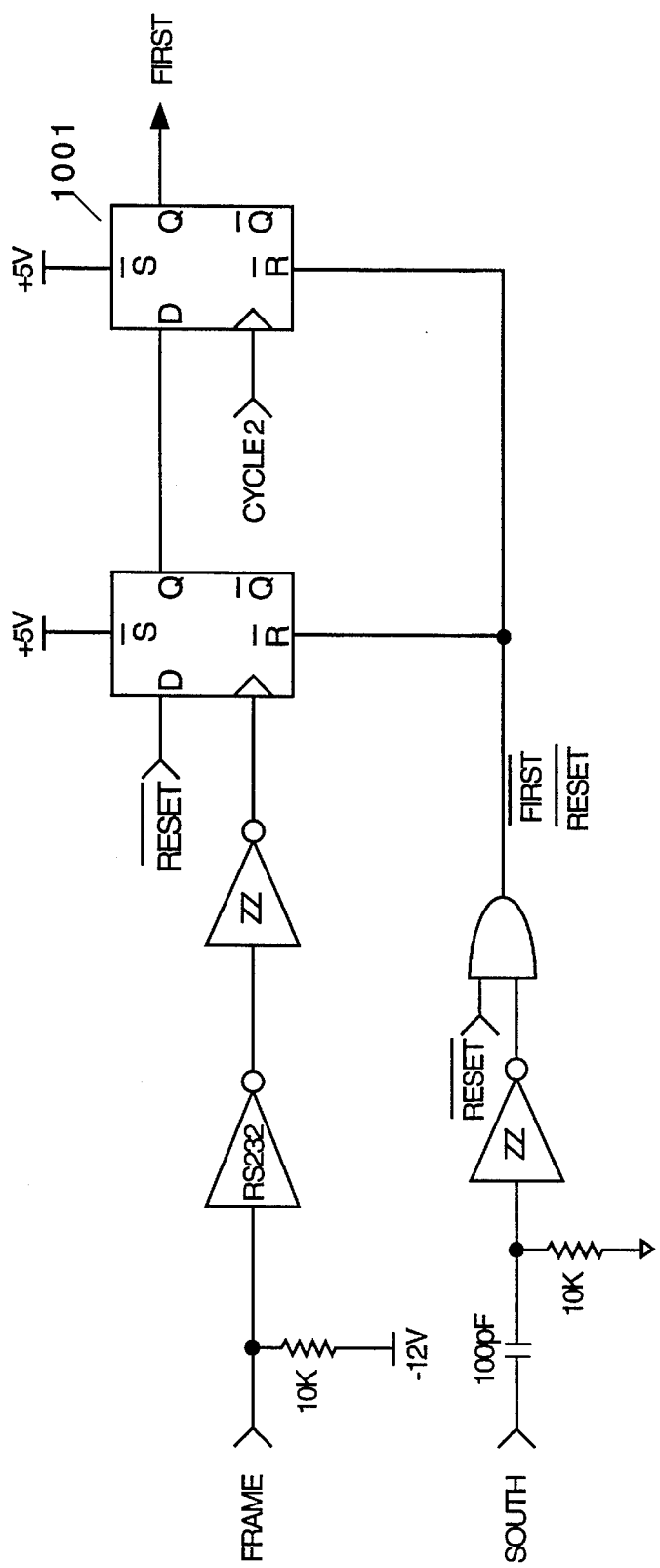
FIG. 10A shows the circuit used in processing the FRAME signal when received by the encoder and FIG. 10B shows the circuit used to generate the $\overline{\text{SHIFT RESET}}$ signal.
Figure 10B:
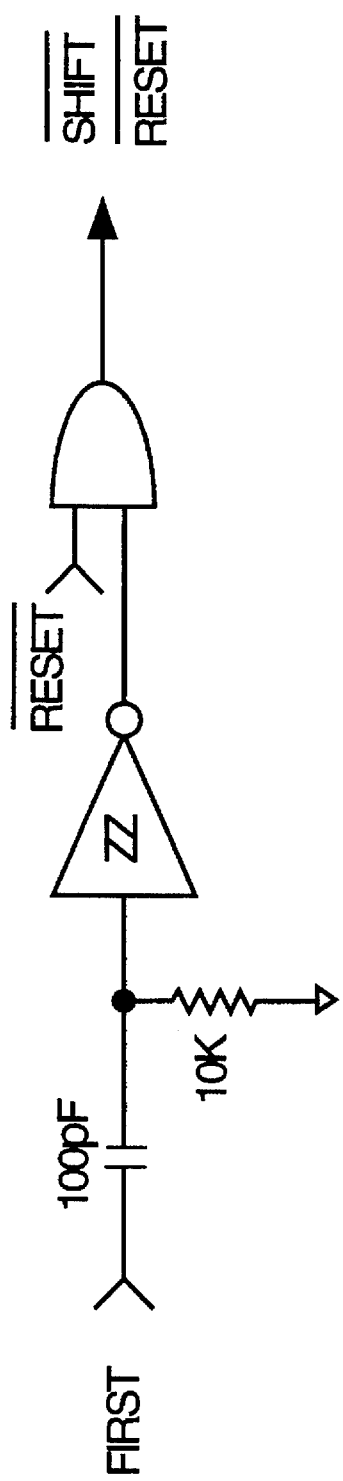

FIG. 10A shows the circuit used in processing the FRAME signal when received by the encoder. Basically, flip-flop 1001 is triggered by the next active CYCLE2 signal. Thereupon, an active FIRST signal is output. The FIRST signal is used to ripple through an array of five 8-bit registers, such as the registers shown in FIG. 11. The FIRST signal is also used to generate the $\overline{\text{SHIFT RESET}}$ signal, as shown in the circuit of FIG. 10B. Thus, if a subsequent FIRST signal is generated, the entire circuit is reset to erase any pulse rippling through the registers.

Figure 11:
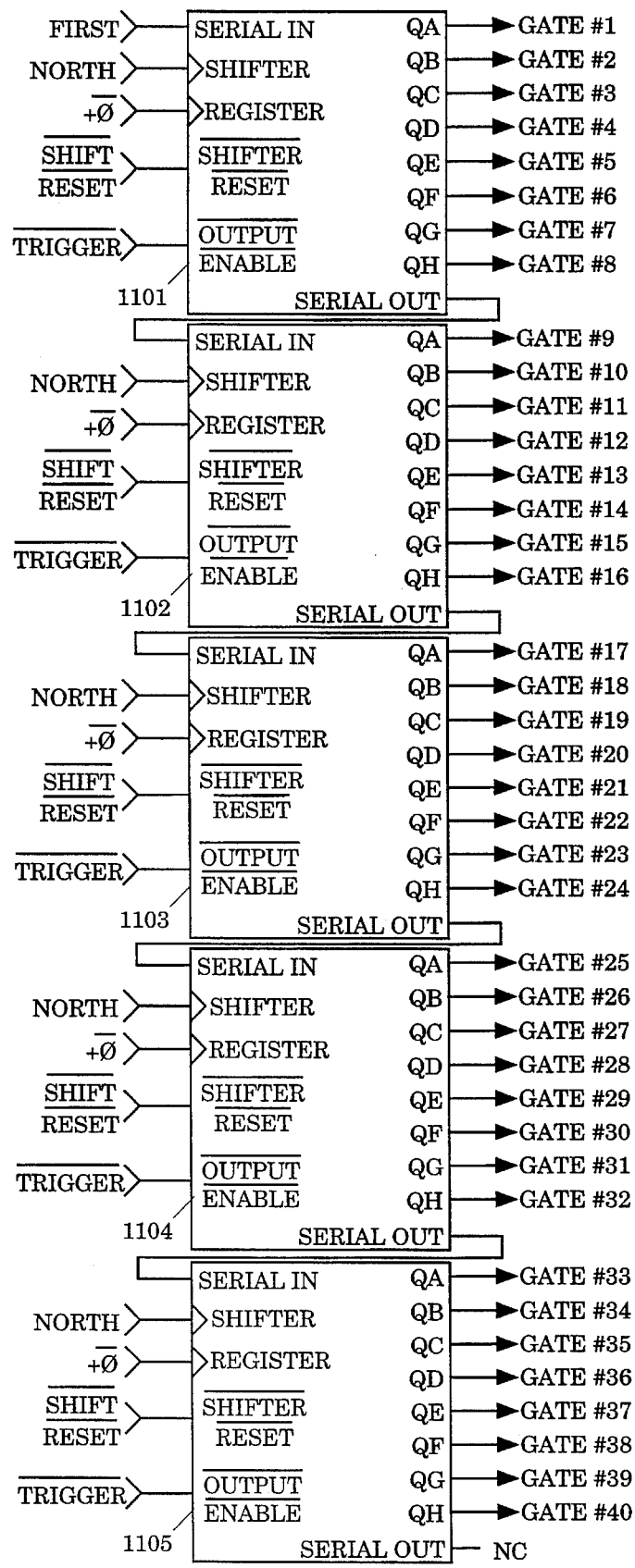
FIG. 11 shows a FIRST signal which is used to ripple through an array of five 8-bit registers.

Referring to FIG. 11, the five 8-bit registers 1101–1105 are chained together, such that they determine which electromagnet receives the programming pulse. The chain is comprised of the combination of a shift register and an output register. The shift register is clocked by the NORTH signal, and the output register is updated with the next +Ø signal. The FIRST signal at the front end serial-in input is active high for only one rising edge of the NORTH clock. Consequently, only one single active high bit is transferred down the shift register. Since the SOUTH signal is $\overline{\text{NORTH}}$, the SOUTH signal is active high once and the NORTH signal is active high once while the single shifted bit is at each of the 40 magnet select positions.

A REQUEST signal is generated when the NORTH and SOUTH signals become active for each one of the magnets. A REPLY signal may be returned for neither, either, but not both the NORTH and SOUTH requests. A REPLY causes the $\overline{\text{TRIGGER}}$ signal to go active low. In turn, this enables all outputs of the shift register chain. The $\overline{\text{TRIGGER}}$ signal is a 100 μsec active low pulse that coincides with either a 100 μsec active low $+\overline{\text{GATE}}$ or $-\overline{\text{GATE}}$ pulse, depending upon whether a NORTH or a SOUTH request was answered. The $+\overline{\text{GATE}}$ signal determines the polarity of the magnet's current pulse. The shift chain position with the active high bit selects the magnet position to be energized. Triacs are used in this selection process. The triacs used are sensitive gate devices. The triac corresponding to the active high gate signal is fired. The selected triac is turned off when the underdamped resonating programming current pulse attempts to reverse the current flow. The shift register contents are cleared whenever a FIRST signal goes active. Hence, this ensures that a second active bit cannot be sent down the shift register chain if an active bit is already in progress somewhere in the chain.

Figure 12A:
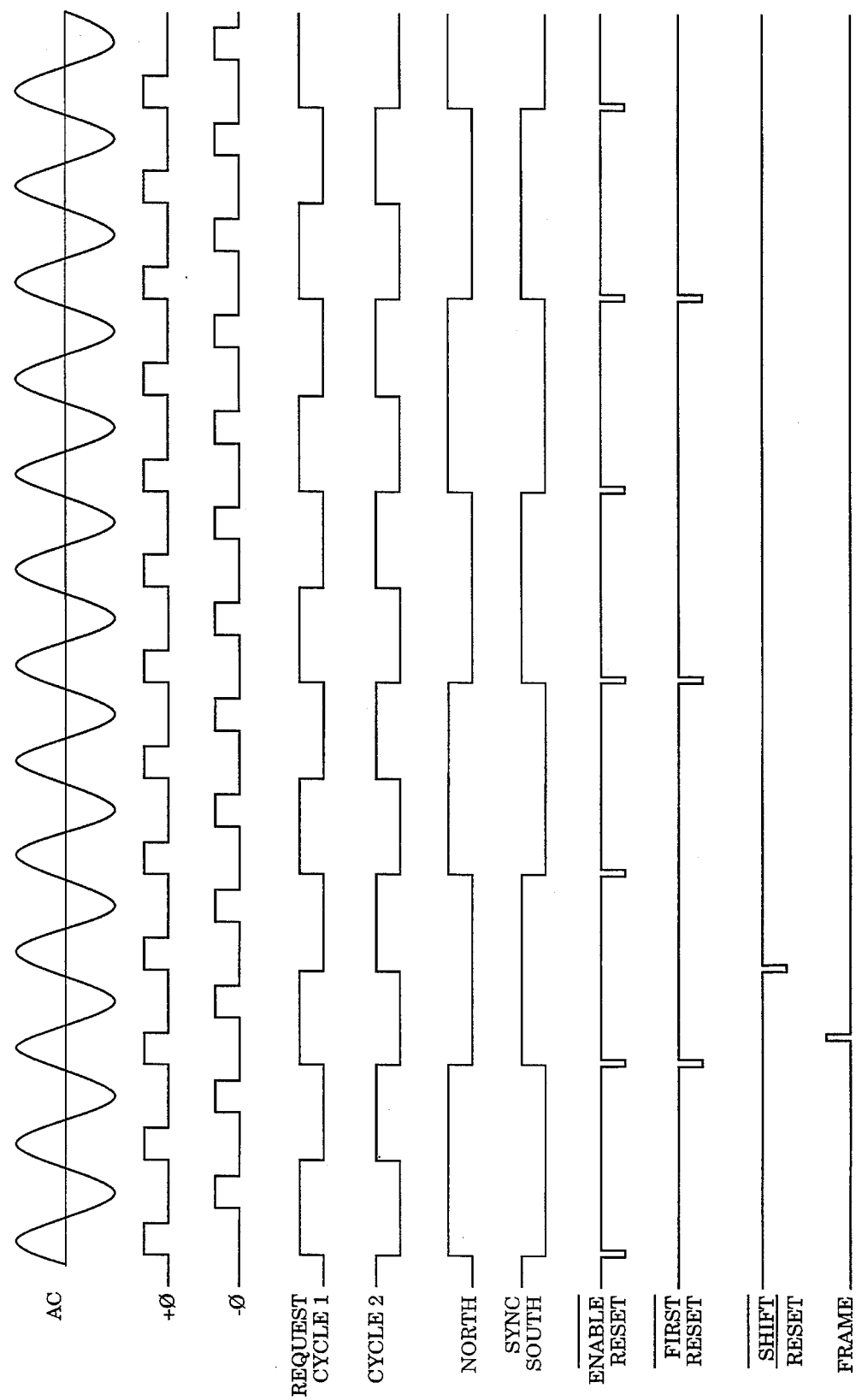
FIGS. 12A and 12B show a timing diagram for the different signals involved with a typical energizing of the first two electromagnets.
Figure 12B:
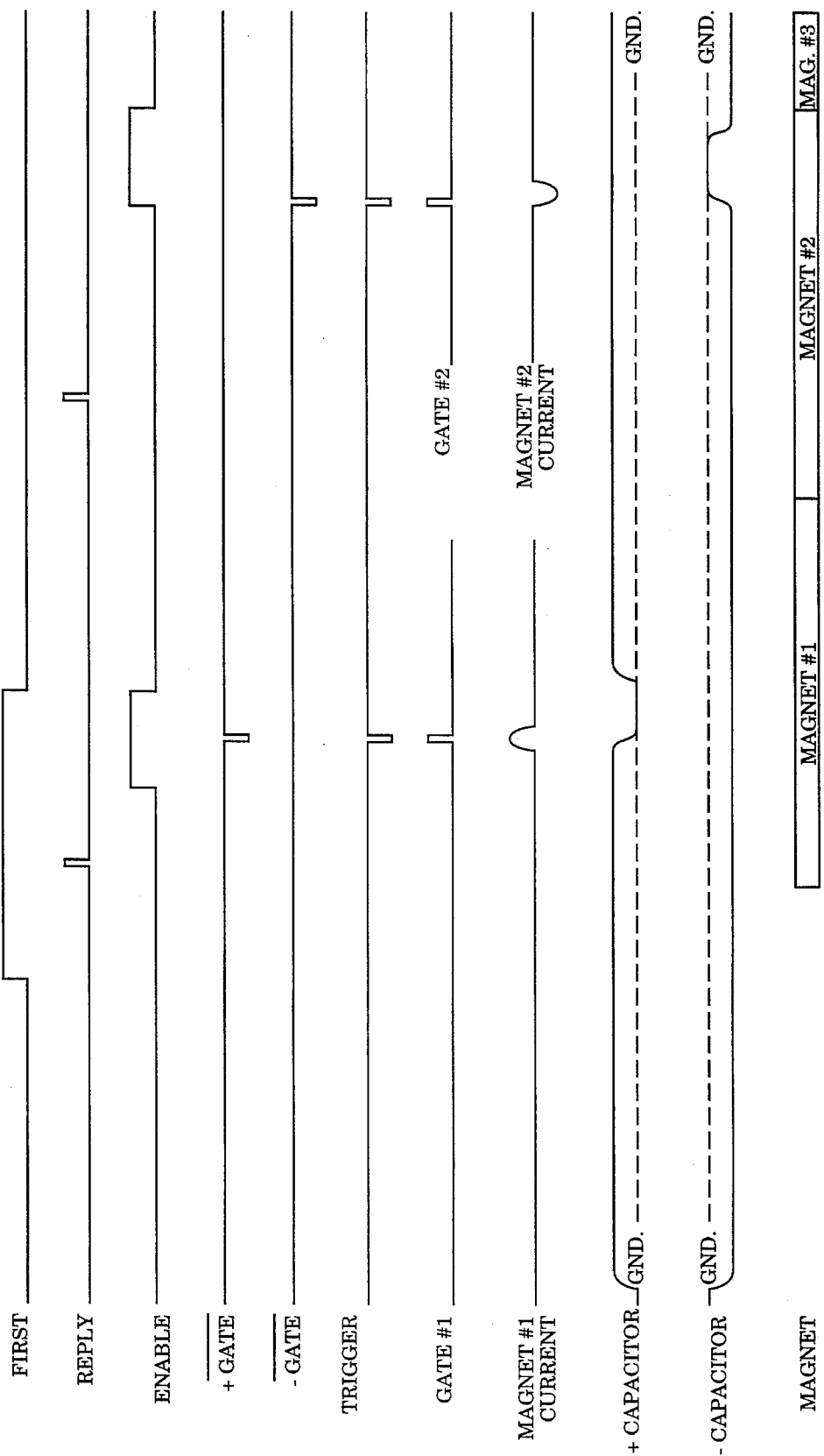

FIGS. 12A and 12B show a timing diagram for the different signals involved with a typical energizing of the first two electromagnets. In this example, the first electromagnet is programmed with a North polarity, and the second electromagnet is programmed with a South polarity. Note that the REQUEST and SYNC signals both being active is-the cue for the FRAME response pulse, which provides the single shift register bit. It should also be noted that each magnet has two associated REQUEST rising edges—one provides the cue for programming North, while the other provides the cue for programming South.

Thus, a computerized magnetic card key programmer is described.

What is claimed is:

1. An apparatus for programming a magnetic card key associated with a magnetic locking device, said apparatus comprising:

a computer having an input device for inputting a plurality of codes and a memory for storing said plurality of codes;

an encoder having a slot for accepting said magnetic card key, wherein when said magnetic card key is inserted in said slot, said encoder encodes said magnetic card key with a particular code corresponding to said magnetic locking device as supplied by said computer, said encoder comprising a plurality of electromagnets having a sufficiently narrow thickness to enable the plurality of electromagnets to be concurrently placed in close proximity to the inserted magnetic card key, said electromagnets being programmed by said computer to encode said magnetic card key with south and north polarities according to said particular code corresponding to said magnetic locking device, wherein each of said electromagnets is constructed in a complete magnetic loop, in which a pathway from a first end of the electromagnet to a second end of the electromagnet is constructed of materials that pass magnetic fields with little or no reluctance, wherein the electromagnet operates in a highly efficient manner; and an interface coupling said computer and said encoder.

2. An apparatus for programming a magnetic card key associated with a magnetic locking device, said apparatus comprising:

a computer having an input device for inputting a plurality of codes and a memory for storing said plurality of codes;

an encoder having a slot for accepting said magnetic card key, wherein when said magnetic card key is inserted in said slot, said encoder encodes said magnetic card key with a particular code corresponding to said magnetic locking device as supplied by said computer, said encoder comprising a plurality of electromagnets having a sufficiently narrow thickness to enable the plurality of electromagnets to be concurrently placed in close proximity to the inserted magnetic card key, said electromagnets being programmed by said computer to encode said magnetic card key with south and north polarities according to said particular code corresponding to said magnetic locking device, wherein said plurality of electromagnets of the encoder are arranged in pairs in push-pull configurations corresponding to different locations on the inserted magnetic card key, such that for each pair, a first electromagnet of the pair is located in close proximity to a corresponding location at a first surface of the inserted magnetic card key and a second electromagnet of the pair is located in close proximity to the corresponding location at a second opposing surface of the inserted magnetic card key; and an interface coupling said computer and said encoder.

3. The apparatus of claim 2, wherein said encoder is further comprised of a shift register chain that determines which of said electromagnets are activated and a polarity corresponding to an activated electromagnet.

4. An apparatus for programming a magnetic card key associated with a magnetic locking device, said apparatus comprising:

a computer having an input device for inputting a plurality of codes and a memory for storing said plurality of codes;

an encoder comprising;

a slot for accepting said magnetic card key, wherein when said magnetic card key is inserted in said slot, said encoder encodes said magnetic card key with a particular code corresponding to said magnetic locking device as supplied by said computer, a plurality of electromagnets having a sufficiently narrow thickness to enable the plurality of electromagnets to be concurrently placed in close proximity to the inserted magnetic card key, said electromagnets being programmed by said computer to encode said magnetic card key with south and north polarities according to said particular code corresponding to said magnetic locking device;

a capacitor and inductor coupled to said plurality of electromagnets for storing charge;

a silicon controlled rectifier coupled between the capacitor and the electromagnets for controlling discharge of said capacitor;

a control circuit coupled to said silicon controlled rectifier to initiate the discharge of said capacitor; and a tuned resonating underdamped RLC circuit coupled to said silicon controlled rectifier, said RLC circuit generating a signal comprising a resonating current signal, said RLC circuit turning off said silicon controlled rectifier after a first resonant peak of the resonating current signal, thereby ceasing discharge of the capacitor such that no further current is generated by the RLC circuit; and an interface coupling said computer and said encoder.

5. The apparatus of claim 4, wherein said capacitor stores sufficient charge to generate at least an eighty-four ampere current.

6. A method for programming a magnetic card key associated with a magnetic locking device, said method comprising the steps of;

storing a plurality of codes in a memory of a computer system;

inputting an identification corresponding to said magnetic card key to said computer system;

searching said memory to locate a particular code corresponding to said identification; encoding a magnetic card key which has been inserted within an encoder with said particular code specified by said computer system;

placing a plurality of electromagnets in close proximity to an inserted magnetic card key; and programming said electromagnets by said computer system to encode said magnetic card key with south and north polarities according to said code corresponding to said magnetic locking device; comprising the steps of;

charging a capacitor coupled to said plurality of electromagnets, discharging said capacitor according to a silicon controlled rectifier coupled to said capacitor and terminating said discharging step in response to a tuned resonating underdamped RLC circuit coupled to said silicon controlled rectifier.

7. The method of claim 6 further comprising the step of programming a shift register chain to specify which of said electromagnets are activated and a polarity corresponding to an activated electromagnet.

8. An encoder for programming a magnetic card key associated with a magnetic locking device, said encoder comprising a slot for accepting said magnetic card key, and a plurality of electromagnets having a sufficiently narrow thickness to enable the plurality of electromagnets to be concurrently placed in close proximity to the inserted magnetic card key, said electromagnets being selectively activated according to input data received by the encoder to encode said magnetic card key with south and north polarities, said electromagnets being constructed in a complete magnetic loop, in which electromagnet is constructed of materials that pass magnetic fields with little or no reluctance, wherein the electromagnet operates in a highly efficient manner.

9. An encoder for programming a magnetic card key associated with a magnetic locking device, said encoder comprising a slot for accepting said magnetic card key, and a plurality of electromagnets having a sufficiently narrow thickness to enable the plurality of electromagnets to be concurrently placed in close proximity to the inserted magnetic card key, said electromagnets being selectively activated according to input data received by the encoder to encode said magnetic card key with south and north polarities, said plurality of electromagnets being arranged in pairs in push-pull configurations corresponding to different locations on the inserted magnetic card key, such that for each pair, a first electromagnet of the pair is located in close proximity to a corresponding location at a first surface of the inserted magnetic card key and a second electromagnet of the pair is located in close proximity to the corresponding location at an opposing surface of the inserted magnetic card key.

* * * * *